(12) United States Patent
Cheng et al.

(10) Patent No.: US 10,240,961 B2
(45) Date of Patent: Mar. 26, 2019

(54) ELECTRONIC WATER METER

(71) Applicant: MultiDimension Technology Co., Ltd., Zhangjiagang (CN)

(72) Inventors: Xiaofeng Cheng, Zhangjiagang (CN); James Geza Deak, Zhangjiagang (CN)

(73) Assignee: MULTIDIMENSION TECHNOLOGY CO. LTD, Zhangjiagang (CN)

( * ) Notice: Subject to any disclaimer, the term of this patent is extended or adjusted under 35 U.S.C. 154(b) by 0 days.

(21) Appl. No.: 14/784,592

(22) PCT Filed: Apr. 18, 2014

(86) PCT No.: PCT/CN2014/075734
§ 371 (c)(1),
(2) Date: Oct. 15, 2015

(87) PCT Pub. No.: WO2014/169851
PCT Pub. Date: Oct. 23, 2014

(65) Prior Publication Data
US 2016/0069723 A1   Mar. 10, 2016

(30) Foreign Application Priority Data
Apr. 18, 2013 (CN) .......................... 2013 1 0135907

(51) Int. Cl.
*G01F 15/06* (2006.01)
*G01D 5/14* (2006.01)
*G01F 15/075* (2006.01)

(52) U.S. Cl.
CPC ............. *G01F 15/066* (2013.01); *G01D 5/14* (2013.01); *G01D 5/145* (2013.01); *G01F 15/0755* (2013.01)

(58) Field of Classification Search
CPC ..... G01F 15/066; G01F 15/0755; G01D 5/14; G01D 5/145
See application file for complete search history.

(56) References Cited

U.S. PATENT DOCUMENTS

| | | | |
|---|---|---|---|
| 2,757,364 A * | 7/1956 | Hood ..................... | G01F 15/066 116/204 |
| 5,543,613 A | 8/1996 | Mettker | |

FOREIGN PATENT DOCUMENTS

| CN | 2903916 Y | 5/2007 |
|---|---|---|
| CN | 102472637 | 5/2012 |

(Continued)

OTHER PUBLICATIONS

"European Application No. 14785733.8, Extended European Search Report dated Nov. 25, 2016", (dated Nov. 25, 2016), 9 pgs.

(Continued)

*Primary Examiner* — Julian D Huffman
*Assistant Examiner* — Michael T Konczal
(74) *Attorney, Agent, or Firm* — Schwegman Lundberg & Woessner, P.A.

(57) ABSTRACT

An electronic water meter capable of implementing precision metering. The electronic water meter comprises a machine frame, multiple counter units, and multiple shielding plates. The counter units comprise numerical character wheels, magnets, magnetic angular displacement sensors, and digital circuits. The magnetic angular displacement sensors are electrically connected to the digital circuits, sense components of magnetic fields at respective positions thereof on the basis of angular position changes of magnetic field vectors of the counter units, and transmit a corresponding electric signal to the digital circuits. The digital circuits perform a calculation processing on the basis of the electrical signal outputted by the magnetic angular displacement sensors and output a digital signal corresponding to the (Continued)

angular positions of the numerical character wheels. The shielding plates are arranged on two sides of the counter units and are used for isolation among the multiple counter units and between the multiple counter units and the external. The electronic water meter has the advantages of a compact size, easy installation, high metering precision, and powerful anti-interference capability.

20 Claims, 4 Drawing Sheets

(56) References Cited

FOREIGN PATENT DOCUMENTS

| | | | |
|---|---|---|---|
| CN | 102607661 | | 7/2012 |
| CN | 102628703 A | * | 8/2012 |
| CN | 102628703 A | | 8/2012 |
| CN | 202501890 | | 10/2012 |
| CN | 203337204 | | 12/2013 |
| EP | 0439070 | | 7/1991 |
| JP | 2005274249 | | 10/2005 |
| WO | WO-2006035342 | | 4/2006 |
| WO | WO 2006035342 A1 * | 4/2006 | ............. G01L 5/223 |
| WO | WO-2014/169851 | | 10/2014 |

OTHER PUBLICATIONS

"International Application No. PCT/CN2014/075734, International Search Report dated Jul. 8, 2014", (dated Jul. 8, 2014), 6 pgs.

* cited by examiner

ELECTRONIC WATER METER

PRIORITY CLAIM TO RELATED APPLICATIONS

This application is a U.S. national stage application filed under 35 U.S.C. § 371 from International Application Serial No. PCT/CN2014/075734, which was filed 18 Apr. 2014, and published as WO2014/169851 on 23 Oct. 2014, and which claims priority to Chinese Application No. 201310135907.4, filed 18 Apr. 2013, which applications and publication are incorporated by reference as if reproduced herein and made a part hereof in their entirety, and the benefit of priority of each of which is claimed herein.

TECHNICAL FIELD

The present invention relates to an electronic water meter, in particular it relates to an electronic water meter utilizing magnetic angular displacement sensors, shielding plates, numbered wheels, and permanent magnets, in order to provide high precision measurement.

BACKGROUND TECHNOLOGY

Traditional electronic water meters using optical encoder technology for digital counting and measurement have been widely used in the water distribution industry, but the technology has inherent flaws, such as difficult assembly, high failure rate, and poor immunity to interference. With the development of magnetic sensor technology, water meters using magnetic sensing technology for the counting mechanism are gradually beginning to replace optical encoder technology. This is because magnetic sensor technology enables high resolution, good stability, and good interference immunity. For these purposes magnetic angle sensing technology is the best. The operating principle of magneto resistive sensors such as a magnetic angle sensor is that they measure the rotation angle of the magnetic field vector produced by a magnet installed on a numbered wheel, and through a corresponding digital processing unit output a digital value.

Magnetic angle sensor technology has high accuracy and good interference immunity, but because it relies on the intensity of the magnetic field, and it tests the total magnetic field strength, the highest precision results may not be obtained, because sensor and permanent magnet relative placement within the water meter greatly influences accuracy, and additionally a strong field if present will influence the measurement, so measurement accuracy may be greatly reduced if not well implemented. Adopting magnetic angle sensor technology in electronic water meters will require the use of a multiplicity of permanent magnets and sensors, the interference of which will affect electronic water meter accuracy. Additionally, the external magnetic field can affect accuracy.

SUMMARY OF THE INVENTION

The object of the present invention is to overcome the above problems of the prior art, in order to provide an accurate electronic water meter. The present invention uses numbered counting wheels installed with permanent magnets, a shielding plate on the other side of the permanent magnet for magnetic shielding, such that there is no interference between adjacent units, thus the magnetic angular displacement sensor only detects the permanent magnet in its own counting unit, thereby increasing the angular precision of the magnetic angular displacement sensor, which in turn improves the precision electronic water meter.

To achieve the above technical purpose and the desired technical result, the present invention is realized by the following technical implementations:

An electronic water meter, the electronic water meter comprises:

A frame;

A plurality of counting units, wherein each of the counting units comprises:

A numbered wheel, which is mounted so that it may be rotated relative to the frame;

A set of permanent magnets on the numbered wheels;

A magnetic angular displacement sensor, sensing the magnetic field at the location of the sensor, which changes according to the angular position of the magnetic field vector produced by the counting unit, and outputs a corresponding electrical signal; And, a digital circuit, the digital circuit is electrically connected with the magnetic angular displacement sensor;

The digital circuit uses the electric signal output from the magnetic angle sensor to perform a calculation of the angular position of the corresponding numbered wheel, and output the angular position of the corresponding numbered wheel;

A plurality of shield plates located on both sides of each of the counting units, between which a the plurality of counting units are magnetically isolated from each other and from the from the outside world.

Preferably, the magnetic angular displacement sensor is an AMR angular displacement sensor, a GMR angular displacement sensor, or a TMR angular displacement sensor.

Preferably, in each of the counting units, the numbered wheel is connected to the frame using a bearing.

Preferably, in the same counting unit, the counting unit further comprises a rotating shaft, said rotating shaft is provided at one end with a shielding plate, and said numbered wheel is fit as a sleeve onto the rotating shaft.

Preferably, in the same counting unit, said counting unit further comprises a rotating shaft, said rotating shaft is provided at one end with a shielding plate, the digital circuitry is provided at the other end, and said numbered wheel is fit as a sleeve onto the rotating shaft.

Preferably, in the same counting unit, said permanent magnet and said numbered wheel are mounted coaxially, such that they rotate together.

Preferably, the magnetic angular displacement sensor is centrally located within the each counting cell on the axis of rotation of the permanent magnet.

Preferably, within the same counting unit the numbered wheels and the permanent magnet are coaxially mounted on the same rotating shaft.

Preferably, in the same counting unit, the magnetic angular displacement sensor's sensing direction and the permanent magnet's axis of rotation are perpendicular, said magnetic angular displacement sensor's sensing axes and the magnetic field generated by the permanent magnet are in the same plane, and the magnetic field vector rotation angle is representative of the angular displacement of the permanent magnet.

Preferably, the magnetic angular displacement sensor is isolated from adjacent counting unit permanent magnets by the shielding plate, the magnetic angular displacement sensor only senses the magnetic field from the permanent magnet in its own counting unit, but does not sense the influence of the permanent magnet from the adjacent counting unit or the external environment.

Preferably, the magnetization direction of each permanent magnet is perpendicular to its rotational axis, and the magnetization directions of all of the permanent magnets are similarly aligned with respect to their rotational axis.

Preferably, the shield plate fixed to the frame, each of the shield plates parallel to each other and perpendicular to the rotational axis of the permanent magnet.

Preferably, the shield plate is composed of a soft magnetic material, such as iron, steel, nickel-iron alloys, iron-aluminum alloys, iron-silicon-aluminum alloys, iron-silicon alloys, iron-cobalt alloys, amorphous soft magnetic alloys, nanocrystalline soft magnetic alloys, soft magnetic ferrites, or the above materials in powdered form embedded in plastic, rubber, or resin composite.

Preferably, within each counting unit, said digital circuit is built onto a digital circuit board, the digital circuit board is connected to the frame, but not with the numbered wheels of the permanent magnets.

Preferably, the adjacent counting unit's numbered wheels rotate with an N:1 turns relationship, where N is an integer greater than or equal to 1.

Compared with the prior art, the present invention has the following advantageous properties:

(1) It is not sensitive to impurities in the water, vibration, or other external interference;

(2) It uses a shielding plate fixed in the unit, permitting one to freely adjust the position and size to shield to eliminate the mutual magnetic field interference between adjacent counting units and also the external magnetic field, this is easy to install, and the unit is easy to maintain;

(3) The shielding plate and the numbered wheel are separate from each other, reducing the weight of the numbered wheel, increasing the precision of small flow sensors;

(4) The magnetic angular displacement sensor is installed on the axis of rotation of the permanent magnet permitting a more precise measurement of the rotation angle of the permanent magnet, and thereby the numbered wheel, which greatly improves measurement accuracy of the water meter.

The above description is only an overview of technical solutions of the present invention, in order to more clearly understand the techniques through which the present invention can be implemented in accordance with the contents of the specification, the following description presents the preferred embodiments of the present invention in detail in conjunction with the accompanying drawings.

BRIEF DESCRIPTION OF THE DRAWINGS

The drawings described herein are intended to promote a further understanding of the present invention, as a part of this application; they describe exemplary embodiments of the present invention and are used to explain the present invention. They are not intended to limit the present invention to the specifics of the drawings. The appended drawings are as follows.

DESCRIPTION OF THE PREFERRED EMBODIMENTS

The present invention is described in detail below with reference to the accompanying drawings in conjunction with specific embodiments.

EXAMPLE 1

Figure 1:
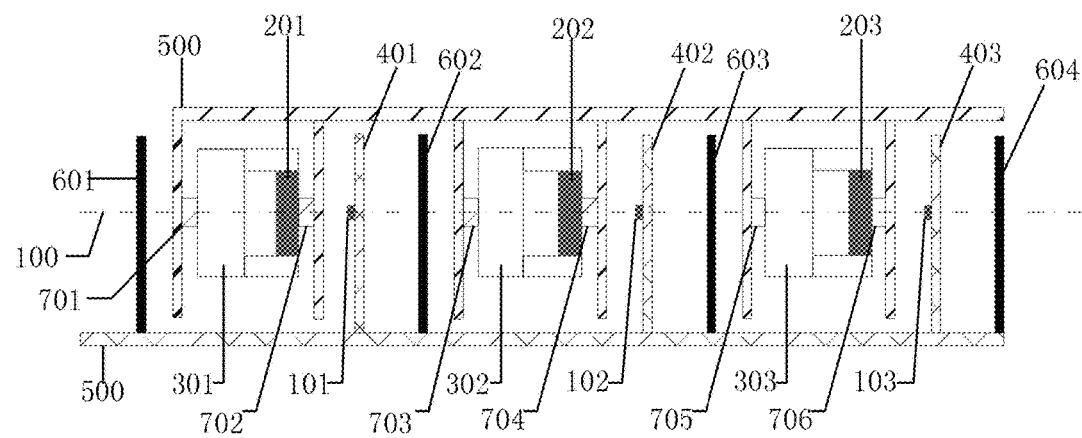
FIG. 1 is a schematic diagram of implementation example 1 of the electronic water meter.

FIG. 1 shows a schematic diagram illustrating the structure of example 1 of the present invention. The electronic water meter comprises a frame 500, three counting units, and shielding plates 601-604. Three counting unit are arranged along the longitudinal direction of the rack, and these counting units include magnetic angular displacement sensors 101-103, permanent magnets 201-203, numbered wheels 301-303, and digital circuits 401-403.

Additionally, the counting wheels 301-303 use wheel bearings 701-706 to attach to the frame 500 permitting rotational motion. The permanent magnets 201-203 are arranged on the numbered wheels 301-303, and with the numbered wheels 301-303 coaxially placed, permitting synchronous rotation.

As a result, the numbered wheels 301-303, the permanent magnets 201-203, and the bearings 701-703 rotate about common rotational axis 100. Shielding plates 601-604 are mounted on the frame 500, these and the frame 500 constitute a shielding structure, wherein the shielding plates 601-604 are parallel to each, and perpendicular to the axis of rotation 100. The bearings 701-706 are mounted on the frame 500, these and frame 500 constitute a rotating rack support structure, permitting the rotation of the numbered wheel 301-304 and permanent magnet 201-203 assemblies with respect to the frame.

Shown in FIG. 1, the numbered wheel and permanent magnet within the counting unit, are connected on both sides coaxially by bearings, for example numbered wheel 301 has bearings 701 and 702 connected with frame 500 permitting rotary motion, permanent magnet 201 is set on numbered wheel 301, bearings 701 and 702 support numbered wheel 301 during rotary motion.

Preferably, the magnetic angular displacement sensors 101-103 are AMR angular displacement sensors, GMR angular displacement sensors, or TMR angular displacement sensors. The magnetic angular displacement sensors 101-103 are mounted coaxially on rotation axis 100, they are parallel with the counting unit permanent magnets 201-203 separated a certain distance from the face. The magnetic angular displacement sensors 101-103 within the counting unit are electrically connected to digital circuits 401-403.

During operation of the electronic water meter, the magnetic angular displacement sensors 101-103 remain static with respect to frame 500, whereas the numbered wheels 101-103 and the permanent magnets rotate about the axis of rotation, and the magnetic angular displacement sensors 101-103 have sensing directions perpendicular to the axis of rotation 100, every magnetic angular displacement sensors measures a constant amplitude rotating magnetic field of the permanent magnet within its own counting unit, and therefore the angle of the magnetic field and corresponding rotation angle of the permanent magnet.

The digital circuits 401-403 within the counting units are electrically connected to magnetic angular displacement sensors 101-103. The digital circuits 401-403 are constructed on a digital circuit board, the digital circuit board is mounted on frame 500, the digital circuit boards do not rotate with numbered wheels 301-303 or permanent magnets 201-203.

The shielding plates 601-604 may have square, circular, or any other relevant shape. Each of the shielding plates has the same shape, and is composed of the same materials. Preferably, when shielding plates 601-603 have a circular shape, they have diameters 6-30 mm, thickness of 0.5-10 mm, and they are separated from the magnetic angular displacement sensors by a distance of 0.5-10 mm. The number of shielding plates and number of counting units is different, roughly 2 to 15 each, and installed in locations consistent with those in FIG. 1. Shielding plates 602 through 603 mutually isolate the counting units, while shielding plates 601 and 604 at the ends provide isolation from the external environment. Shielding plates 601-604 magnetically separate the various counting units, reduce mutual interactions between them, such that the magnetic angular displacement sensors only detect the magnetic field from the permanent magnet within the counting unit, and do not detect the magnetic fields from other permanent magnets or the external environment.

The shielding plates 601-604 are composed of a soft ferromagnetic material, such as iron, steel, nickel-iron alloys, iron-aluminum alloys, iron-silicon-aluminum alloys, iron-silicon alloys, iron-cobalt alloys, amorphous soft magnetic alloys, nanocrystalline soft magnetic alloys, soft magnetic ferrites, or the above materials in powdered form embedded in plastic, rubber, or resin composite.

Before use of the electronic water meter, the magnetic angular displacement sensors 101-103 can be calibrated for location, or for the location of the digital circuit board, to optimize the performance of the digital water meter.

Figure 6:
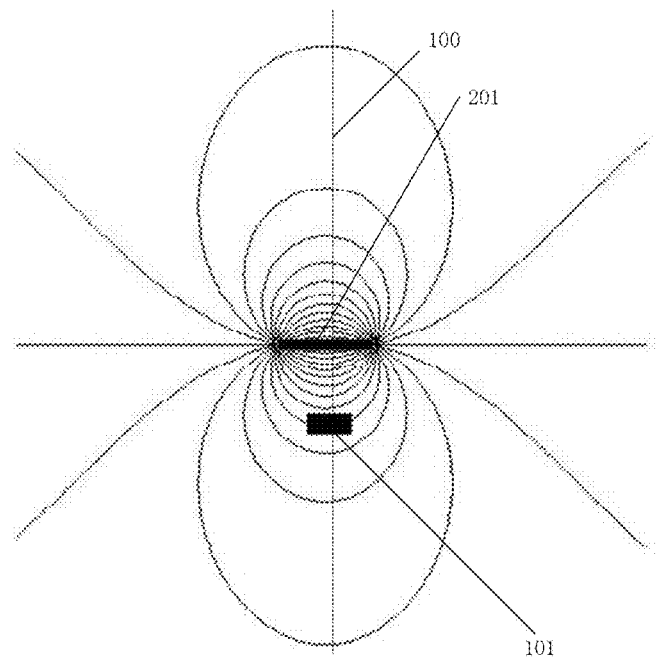
FIG. 6 for the present invention shows a cross-section the magnetic field distribution produced by an isolated permanent magnet on the axis of rotation illustrating the possible interference effect.

FIG. 6 shows a cross-sectional view of the magnetic field distribution in a plane to the rotation axis 100 for a single permanent magnet 201. When permanent magnet 201 rotates around rotation axis 100, magnetic angular displacement sensor 101, measures the angular position of the rotating magnetic field vector, and produces the corresponding output signals. As can be seen from the magnetic field distribution, the magnetic field on the axis of rotation 100 is completely in the sensing direction of magnetic angular displacement sensor 101, such that the output of the magnetic angular displacement sensor would be optimal.

Figure 7:
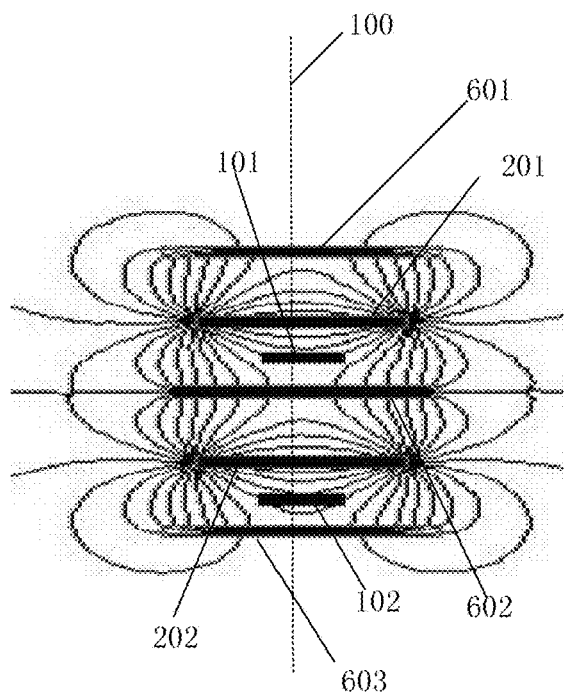
FIG. 7 for the present invention provides a schematic view of the distribution of the magnetic field generated by two permanent magnets in the presence of shielding structures.

FIG. 7 shows the magnetic field distribution emanating from permanent magnets 201 and 202 and influenced by shielding plates 601-603, magnetic angular displacement sensors 101, 102 are on the axis of rotation 100 where the output signal is still the best. The magnetic field from permanent magnet 201 is mostly blocked by shielding plates 601 and 602, such that it does not affect the output of angular displacement sensor 102, similarly, the magnetic field from permanent magnet 202 does not affect the output of angular displacement sensor 101. The closer magnetic angular displacement sensors 101, 102 are positioned to the axis of rotation, the more accurate their output signals, and when magnetic angular displacement sensors 101, 102 are on the axis of rotation 100, they won't be affected by interfering magnetic fields, and they will only detect the magnetic field form the permanent magnet located within the same counting unit.

Digital circuits 403-403 perform calculations based on the electrical output of magnetic angular displacement sensors 101-103, and they output the corresponding digital output signal of numbered wheels 301-303, thereby converting the signal form the magnetic angular displacement sensors into a digital output signal.

The magnetic angular displacement sensors 101-103 sense the change in the magnetic field and output a corresponding electrical signal, through the corresponding digital circuit 401-403, the rotation angle of the permanent magnets 201-203 may be obtained, and according to the angular position of permanent magnets 201-203, the numbered wheel 301 with calibration stored in the digital circuit enables a digital reading utilizing magnetic angular displacement sensors 101-103 to measure the magnetic field angle, and digital circuits 401-403 thereby output the number printed on the numbered wheels 301-303.

EXAMPLE 2

The counting unit includes a numbered wheel, a permanent magnet, and a magnetic angular displacement sensor. Preferably, the electronic water meter includes from 1 to 10 counting units. When the electronic water meter includes multiple counting units, it is necessary that the counting units have a certain revolution relationship with respect to each other. Adjacent counting unit's numbered wheels rotate with an N:1 turns relationship, where N is an integer greater than or equal to 1, and preferably N=10. In this case, when the wheel on the left rotates 10 revolutions, the second numbered wheel rotates 1 revolution, if the 10 numbered wheel is to be rotated 1 revolution, then the first numbered wheel needs to rotate $10^{10}$ times. The magnetic angular displacement sensors may be AMR angular displacement sensors, GMR angular displacement sensors, or TMR angular displacement sensors. Each of the digital circuits is connected to the corresponding output of a magnetic angular displacement sensor, for example digital circuit 401 is connected to the output of magnetic angular displacement sensor 101, such that the output of magnetic angular displacement sensor 101 is converted to a digital format.

EXAMPLE 3

Permanent magnets 201-203 have a center axis that coincides with the axis of rotation 100, and with magnetization aligned perpendicularly to the axis of rotation 100. Preferably, the permanent magnets 201-203 are cylindrical, having a diameter of 2-25 mm, a thickness of 0.5-15 mm. Alternatively, the permanent magnets 201-203 are rectangular cuboids, and the magnetization direction is perpendicular to its thickness direction, wherein these have a length of 2-20 mm, a width of 2-20 mm, and thickness of 1-10 mm. Alternatively, annular cylindrical permanent magnets 201-203 are used which magnetization direction is magnetized radically along a diameter, with an outer diameter of 5-20 mm, an inner diameter of 1-10 mm, a thickness of 1-10 mm. The above-described three shapes are preferred shapes, but the invention is not limited to these shapes. Permanent magnets 201-203 have the same shape, size, and magnetization.

Figure 2:
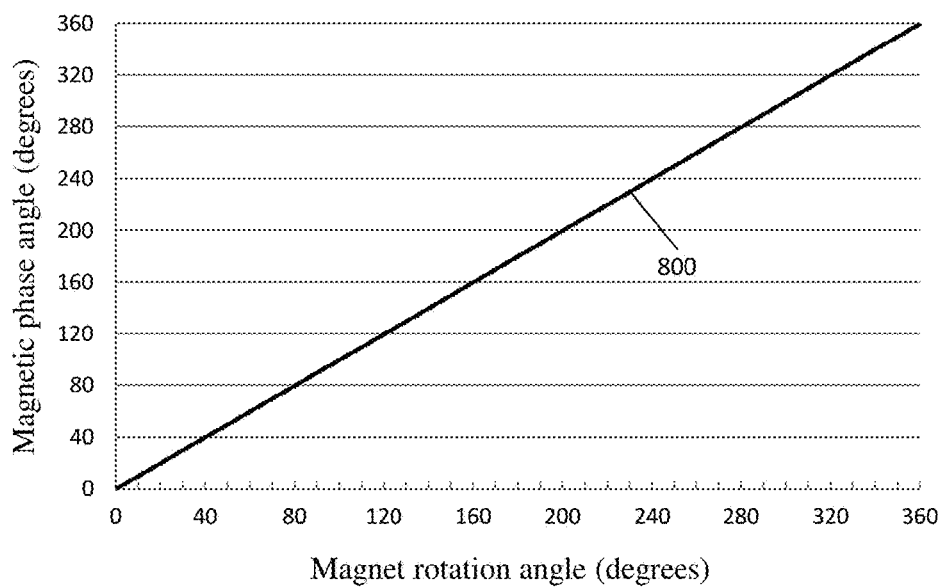
FIG. 2 shows for the present invention a curve representing the angle of the magnetic field of the magnetic field at the position of the angular displacement sensor as a function of the angular displacement of the rotating permanent magnet.
Figure 3:
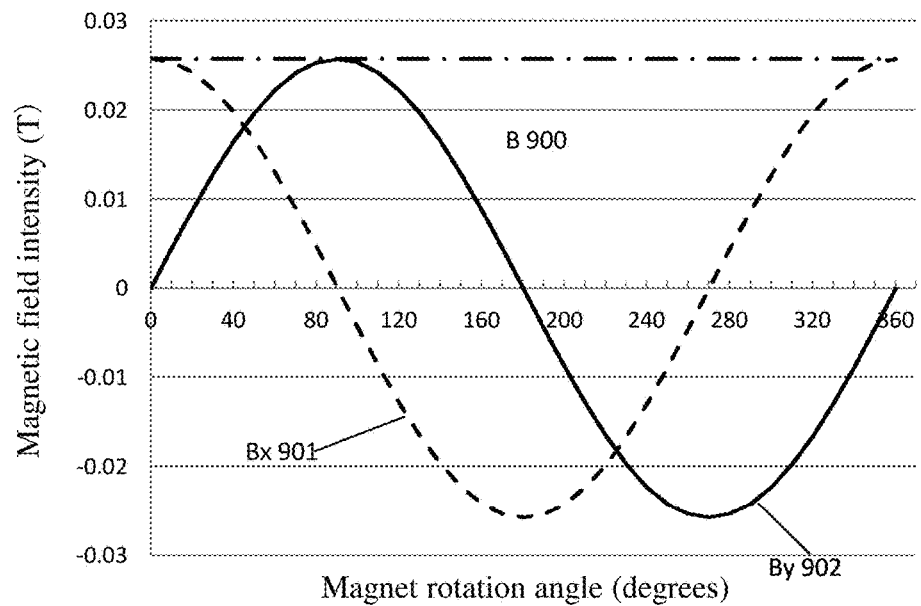
FIG. 3 shows for the present invention with a centered magnetic angular displacement sensor a set of curves representing response to magnetic field components Bx, By as well as the total B vector intensity change as a function of rotation of the permanent magnet.

This is an example of a first counting unit. Permanent magnet 201 is embedded in numbered wheel 301 or pasted on\n the side of numbered wheel 301, numbered wheel 301 has rotating bearings 701 and 702, and magnetic angular displacement sensor 101 is located at a distance of 0.5-6 mm from permanent magnet 201. Magnetic angular displacement sensor 101 is located on central rotation axis 100, or magnetic angular displacement sensor 101 is located within a distance of 0.2-5 mm from the central rotation axis 100. In the measurement area, the measured magnetic field angle is similar or equal in value to the rotation angle of the permanent magnet, for example, FIG. 2 shows response curve 800. As can be seen, the rotation angle of the permanent magnet changes the magnetic field components Bx 901, By 902, but as FIG. 3 shows, the total strength of the magnetic field B 900 remains unchanged. In this invention, from neighboring counting units, permanent magnets 202, 203 and the external magnetic field the output of magnetic angular displacement sensor 101 is only slightly or not affected at all, permitting digital circuit 401 to perform a very precise calculation of the magnetic field angle. Magnetic angular displacement sensor 101 measures the magnetic field components and outputs the corresponding signals, then through a calculation in digital circuit 401 the angle of permanent magnet 201 is determined, and according to this angular position, the digital readout of numbered wheel 301 is determined using a calibration stored in the digital circuit. Thus according to the signal output from magnetic angular displacement sensor 101 in response to the magnetic field angle, digital circuit 401 outputs a digital signal corresponding to the digit on the numbered wheel 301.

Other aspects of the counting unit function similarly to those previously described, and there is no need to repeat them here.

EXAMPLE 4

Figure 4:
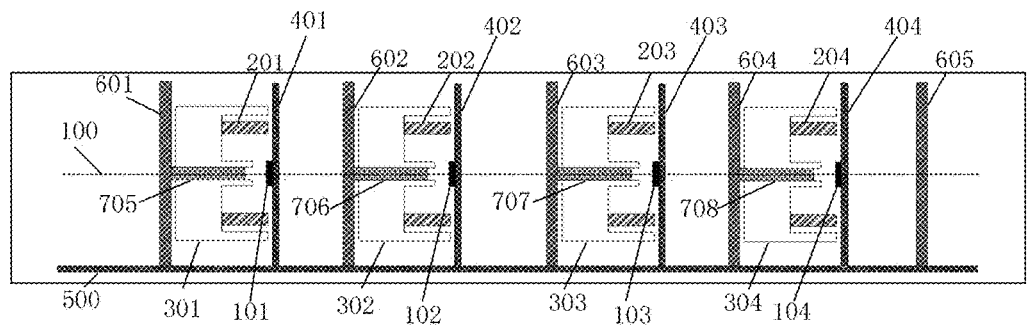
FIG. 4 is a schematic diagram of implementation example 4 of the electronic water meter.

FIG. 4 shows a schematic diagram illustrating implementation example 4 of the present invention of the electronic water meter. The electronic water meter comprises a frame 500, four counting units, and shielding plates 601-605. These four counting units include magnetic angular displacement sensors 101-104, ring-shaped permanent magnets 201-204, numbered wheels 301-304, and rotating shafts 705-708. Preferably, the magnetic angle sensors 101-103 are AMR angular displacement sensors, GMR angular displacement sensors, or TMR angular displacement sensors. Numbered wheels 301-304, ring permanent magnets 201-204, and rotating shafts 705-708 with axis of rotation 100, numbered wheels 301-304 are sleeved onto the rotating shafts 705-708. Shielding plates 601-605 are mounted on the frame 500, these and the frame 500 constitute a shielding structure, the shielding plates 601-605 are mutually parallel to each other, and perpendicular to the axis of rotation 100. Rotating shafts 705-708 are provided at one end with shielding plates 601-604, these and shielding plates 601-604 and constitute a rotatable support structure, this support structure is used to support and permit independent rotation of numbered wheels 301-304 and associated ring-shaped permanent magnets 201-204. In addition, the use of an ring-shaped permanent magnet 201-204 can reduce the mass of the numbered wheels 301-304, making numbered wheel rotation easier, making the measurement more accurate.

As shown in FIG. 4, the numbered wheel and the permanent magnet in the same counting unit, are coaxially connected to the rotating shaft, for example numbered wheel 301 with permanent magnet 201, connected to rotating shaft 705, and rotating shaft 705 supports their rotation. Each of the magnetic angular displacement sensors is placed on either side of the adjacent digital circuitry. Each magnetic angular displacement sensor is a certain distance from the end face of the permanent magnet and the adjacent digital circuit in the same counting unit. Before use of the electronic water meter, the magnetic angular displacement sensors 101-103 can be calibrated for location, or for the location of the digital circuit board, to optimize the performance of the digital water meter. The magnetic sensing direction of the magnetic angular displacement sensors 101-104 is perpendicular to the axis of rotation 100, each magnetic angular displacement sensor detects the angle of the constant amplitude magnetic field of the permanent magnet located in the same counting unit, and the magnetic field angular displacement is the same as the rotational displacement of the permanent magnet.

Shielding plates 601-605 can have a square shape with a hole in the center, or a circular shape, but it is not limited to these shapes, each of the shielding plates has the same shape, and they are each composed of the same material. Preferably, the shielding plates 601-605 have a circular shape with a hole in the center, with a diameter of 6-30 mm, a thickness of 0.5-10 mm, and a spacing relative to the magnetic angular displacement sensors of 0.5-10 mm. Preferably, the shielding plates 601-605 have a square shape with a hole in the center, with a length of 6-30 mm, a width of 6-30 mm, a thickness of 0.5-10 mm, and a spacing relative to the magnetic angular displacement sensors of 0.5-10 mm. The number of shielding plated depends on the number of counting units, preferably there are 2-15 of them, installed in positions like those shown in FIG. 4. Shielding plates 602 to 604 provide magnetic isolation between each counting unit. Shielding plates 601 and 605 isolate the counting units from external magnetic fields. Shielding plates 601-605 provide magnetic isolation for all of the counting units, eliminating mutual interference between the counting units, such that the magnetic angular displacement sensors only detect the magnetic field produced by the permanent magnet within the same counting unit, so they do not detect external magnets or external magnetic fields.

Figure 8:
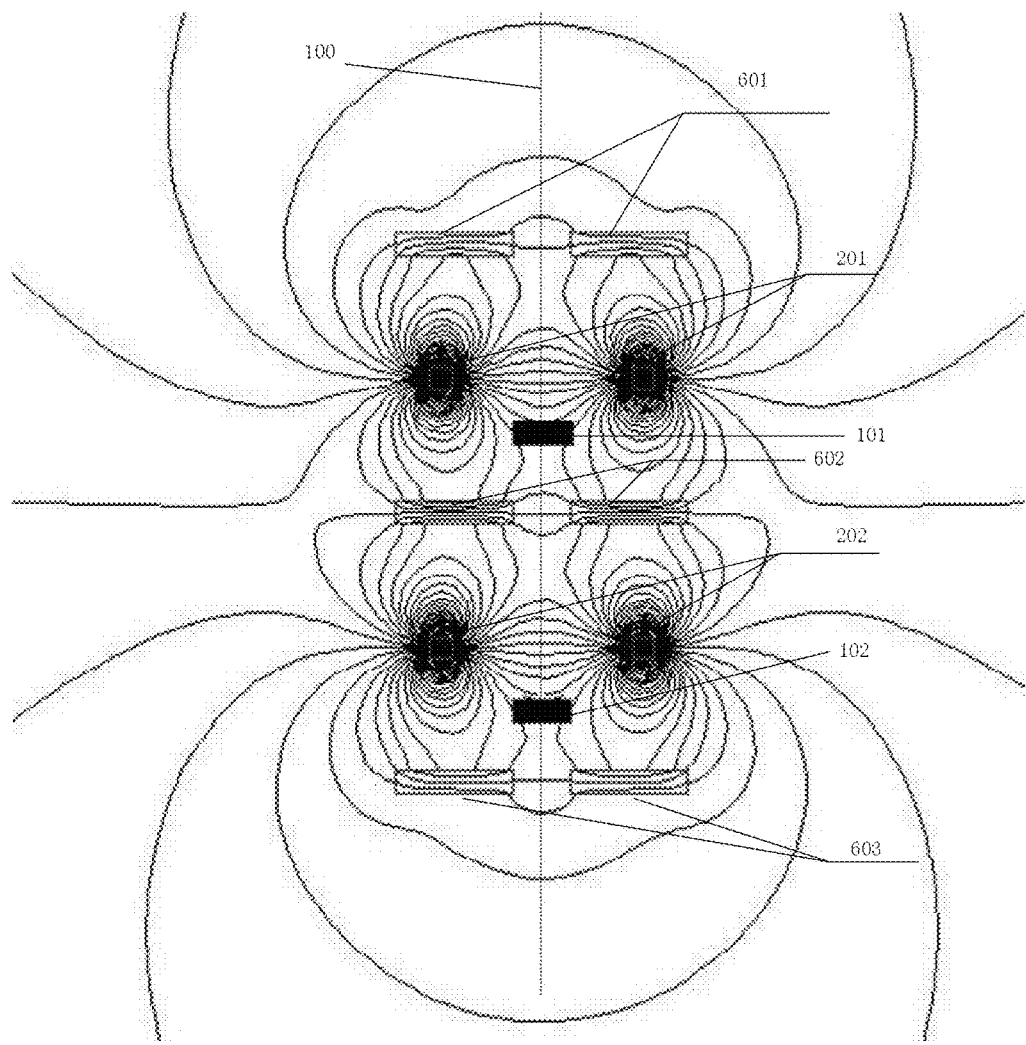
FIG. 8 for the present invention shows the magnetic field of permanent magnet with ring geometry.

FIG. 8 is a schematic view of the magnetic field distribution of Example 4, the magnetic angular displacement sensors are located on the axis of rotation 100, the magnetic field vector in the vicinity of the magnetic angular displacement sensors is substantially in the sensing direction of the magnetic angular displacement sensors, the magnetic operating area is smaller than in the example of FIG. 7, but not smaller than the inner radius of the ring-shaped permanent magnet, the magnetic angular displacement sensor must be placed within a certain distance of the ring-shaped permanent magnet, if the distance is too large magnetic interference will result, in any case this design permits ring-shaped permanent magnets and magnetic angular displacement sensors to be used to provide an output signal that accurately represents the rotational angle of the permanent magnet. But the shielding plates 601-605 with a hole, although the degree of shielding is reduced, they are convenient i=for installation of rotating shafts 701-705, they eliminate the need for an additional support structure, and they thus can reduce overall size.

EXAMPLE 5

Figure 5:
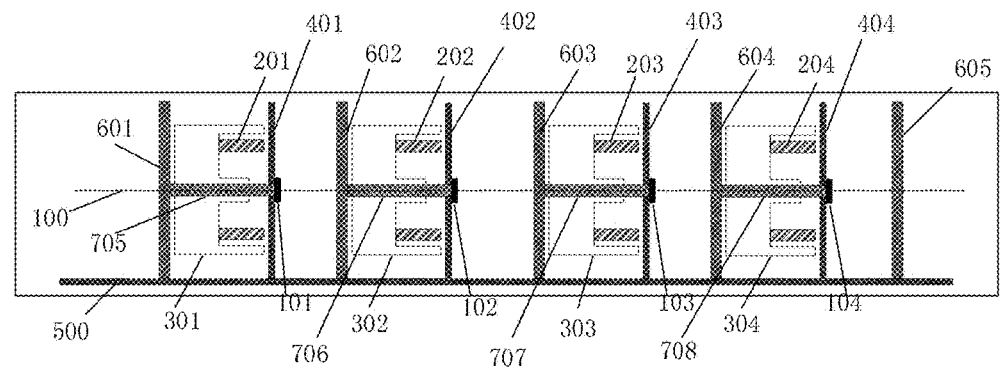
FIG. 5 is a schematic diagram of implementation example 5 of the electronic water meter.

FIG. 5 is a drawing showing the example 5 implementation of the electronic water meter. Compared with the structure in FIG. 4, the differences are as follows: one end of the rotating shafts 705-708 is installed in shielding plates 601-604, the other side is installed on digital circuit boards 401-404 or can be installed on the support for the digital circuit 401-404, in this case better support can be provided, and the magnetic angular displacement sensors can be placed on the other side of the digital circuit boards.

The remainder of this example is the same as example 4, and there is no need to provide further description.

The foregoing only describes preferred embodiments of the present invention, and it does not limit the present invention. Those skilled in the art, may make various modifications and changes to the present invention. Any modification or changes within the spirit or principles of the present invention, including any changes, equivalent replacements, or improvements should be considered within the scope of the present invention.

The invention claimed is:

1. An electronic water meter, the electronic water meter comprising:
    a frame; and
    a plurality of counting units arranged in a row to provide adjacent counting units in the row, wherein an axis of rotation extends through the plurality of counting units in the row, and each of the counting units comprises:
        a numbered wheel configured to be rotated around the axis of rotation and relative to the frame;
        a permanent magnet configured to be rotated around the axis of rotation with the numbered wheel;
        a magnetic angular displacement sensor along the axis of rotation and configured to sense a magnetic field at a location of the sensor and output an electrical signal indicative of an angular position of a magnetic field vector; and
        a digital circuit, electrically connected with the magnetic angular displacement sensor, wherein the digital circuit is configured to use the electric signal output from the magnetic angle sensor to calculate and output an angular position of the corresponding numbered wheel; and
        a plurality of shield plates mounted to the frame along the axis of rotation and configured to magnetically isolate the plurality of counting units from magnetic fields from each other's permanent magnets and from an external environment, the plurality of shield plates being parallel with respect to each other and being perpendicular to the axis of rotation, the plurality of shield plates including a shield plate between each of the adjacent counting units to mutually isolate the adjacent counting units, and including a first end shield plate at the first end of the row and a second shield plate at a second end of the row to provide isolation from the external environment.

2. The electronic water meter according to claim 1, wherein the magnetic angular displacement sensor is an AMR angular displacement sensor, a GMR angular displacement sensor, or a TMR angular displacement sensor.

3. The electronic water meter according to claim 1, wherein in each of the counting units, the numbered wheel is connected to the frame using a bearing.

4. The electronic water meter according to claim 1, wherein each of the counting units further comprise a rotating shaft provided at one end with one of the plurality of shielding plates , wherein the numbered wheel fits as a sleeve onto the rotating shaft.

5. The electronic water meter according to claim 1, wherein each of the counting units further comprise a rotating shaft provided at one end with one of the plurality of shielding plates, wherein the digital circuitry is provided at the other end, and the numbered wheel fits as a sleeve onto the rotating shaft.

6. The electronic water meter according to claim 1, wherein the permanent magnet and the numbered wheel are mounted coaxially and rotate together in each of the counting units.

7. The electronic water meter according to claim 1, wherein the numbered wheels and the permanent magnet are coaxially mounted on a same rotating shaft in each of the counting units.

8. The electronic water meter according to claim 1, wherein the magnetic angular displacement sensor is centrally located within the each of the counting units on an axis of rotation of the permanent magnet.

9. The electronic water meter according to claim 1, the magnetic angular displacement sensor has a sensing direction and the permanent magnet has an axis of rotation perpendicular to the sensing direction, the magnetic angular displacement sensor having sensing axes in a same plane as a magnetic field generated by the permanent magnet, the magnetic field vector rotation angle being representative of an angular displacement of the permanent magnet.

10. The electronic water meter according to claim 1, wherein the magnetic angular displacement sensor only senses the magnetic field from the permanent magnet in its own counting unit and does not sense the influence of the permanent magnet from the adjacent counting unit or the external environment.

11. The electronic water meter according to claim 1, wherein a magnetization direction of each permanent magnet is perpendicular to its rotational axis, and magnetization directions of all of the permanent magnets are similarly aligned with respect to their rotational axis.

12. The electronic water meter according to claim 1, wherein the shield plates are fixed to the frame.

13. The electronic water meter according to claim 1, wherein the shield plate is composed of a soft magnetic material.

14. The electronic water meter according to claim 1, wherein the digital circuit is built onto a digital circuit board, the digital circuit board is connected to the frame, but not with the numbered wheels of the permanent magnets.

15. The electronic water meter according to claim 1, wherein the adjacent counting unit's numbered wheels rotate with an N:1 turns relationship, where N is an integer greater than or equal to 1.

16. An electronic water meter, the electronic water meter comprising:
    a frame;
    at least one shaft mounted to the frame and configured to rotate about an axis of rotation; and
    a plurality of counting units arranged along the axis of rotation in a row to provide adjacent counting units in the row, wherein each of the counting units comprises:
        a numbered wheel configured to be rotated around the axis of rotation and relative to the frame;
        a permanent magnet coaxially positioned with the numbered wheel and configured to be rotated around the axis of rotation with the numbered wheel, the permanent magnet having a face, wherein the axis of rotation is perpendicular to the face of the permanent magnet;
        a magnetic angular displacement sensor along the axis of rotation and coaxially positioned with the permanent magnet and the numbered wheel, and configured to sense a magnetic field at a location of the sensor and output an electrical signal indicative of an angular position of a magnetic field vector; and a digital circuit electrically connected with the magnetic angular displacement sensor, wherein the digital circuit is configured to use the electric signal output from the magnetic angle sensor to calculate and output an angular position of the corresponding numbered wheel; and a magnetic shielding structure including a plurality of parallel shield plates composed of soft magnetic material and mounted to the frame perpendicular to the axis of rotation such that the axis of rotation extends through each of the plurality of shield plates, wherein the magnetic shielding structure is configured to magnetically isolate the plurality of counting units from magnetic fields from each other's permanent magnets and from an external environment, the plurality of shield plates including a shield plate between each of the adjacent counting units to mutually isolate the adjacent counting units, and including a first end shield plate at the first end of the row and a second shield plate at a second end of the row to provide isolation from the external environment.

17. The electronic water meter of claim 16, wherein the at least one shaft is one shaft configured to rotate about the axis of rotation.

18. The electronic water meter according to claim 16, wherein the magnetic angular displacement sensor is an AMR angular displacement sensor, a GMR angular displacement sensor, or a TMR angular displacement sensor.

19. The electronic water meter according to claim 16, wherein the numbered wheel and the permanent magnet are coaxially mounted to a single shaft from the at least one shaft.

20. The electronic water meter according to claim 16, wherein a number of the plurality of parallel shield plates is one more than a number of the plurality of counting units.

* * * * *